(12) United States Patent  
Kunze et al.

(10) Patent No.: US 11,969,709 B2
(45) Date of Patent: Apr. 30, 2024

(54) MOUNTING MEMBER FOR WRAPPING AND MOUNTING A POLLUTION CONTROL ELEMENT

(71) Applicant: 3M INNOVATIVE PROPERTIES COMPANY, St. Paul, MN (US)

(72) Inventors: Ulrich Kunze, Juechen (DE); Kerstin Rosen, Cologne (DE)

(73) Assignee: 3M Innovative Properties Company, St. Paul, MN (US)

( * ) Notice: Subject to any disclaimer, the term of this patent is extended or adjusted under 35 U.S.C. 154(b) by 577 days.

(21) Appl. No.: 15/757,738

(22) PCT Filed: Sep. 7, 2016

(86) PCT No.: PCT/US2016/050493
§ 371 (c)(1),
(2) Date: Mar. 6, 2018

(87) PCT Pub. No.: WO2017/044451
PCT Pub. Date: Mar. 16, 2017

(65) Prior Publication Data
US 2020/0101441 A1    Apr. 2, 2020

(30) Foreign Application Priority Data
Sep. 8, 2015   (EP) .................................... 15184316

(51) Int. Cl.
*D04H 1/413*    (2012.01)
*B01J 21/12*    (2006.01)
(Continued)

(52) U.S. Cl.
CPC ........... *B01J 21/12* (2013.01); *B01J 37/0203* (2013.01); *B01J 37/0213* (2013.01);
(Continued)

(58) Field of Classification Search
CPC .... B01J 21/12; B01J 37/0203; B01J 37/0213; B01J 37/0236; D04H 1/413;
(Continued)

(56) References Cited

U.S. PATENT DOCUMENTS 6,403,526 B1 *  6/2002  Lussier ................ B01J 35/1014
                                                              502/439
7,971,357 B2   7/2011  Ten Eyck et al.
(Continued)

FOREIGN PATENT DOCUMENTS

CH        653288      12/1985
EP        1752266      2/2007
(Continued)

OTHER PUBLICATIONS

International Search Report for PCT International Application No. PCT/US2016/050493, dated Dec. 12, 2016, 5 pages.

*Primary Examiner* — Larissa Rowe Emrich
(74) *Attorney, Agent, or Firm* — Carlos M. Téllez Rodríguez; 3M Innovative Properties Co

(57) ABSTRACT

The invention relates to a mounting member for wrapping and mounting a pollution control element in a casing of a pollution control device, the mounting member comprising: inorganic fiber material; and inorganic particles, wherein the inorganic particles are distributed throughout most of the mat and comprise an average diameter of 800 nm to 15000 nm (DV 50), preferably of 1000 nm to 15000 nm (DV 50) measured according to DIN ISO 13320.

18 Claims, 2 Drawing Sheets

(51) Int. Cl.
*B01J 37/02* (2006.01)
*D04H 1/4209* (2012.01)
*D04H 1/4218* (2012.01)
*D04H 1/4242* (2012.01)
*D04H 1/46* (2012.01)
*D04H 1/488* (2012.01)
*D04H 1/64* (2012.01)
*F01N 3/28* (2006.01)

(52) U.S. Cl.
CPC .......... *B01J 37/0236* (2013.01); *D04H 1/413* (2013.01); *D04H 1/4209* (2013.01); *D04H 1/4218* (2013.01); *D04H 1/4242* (2013.01); *D04H 1/46* (2013.01); *D04H 1/488* (2013.01); *D04H 1/64* (2013.01); *F01N 3/2853* (2013.01); *F01N 3/2857* (2013.01); *D10B 2101/10* (2013.01); *D10B 2101/16* (2013.01); *D10B 2505/04* (2013.01)

(58) Field of Classification Search
CPC .. D04H 1/4209; D04H 1/4218; D04H 1/4242; D04H 1/46; D04H 1/488; D04H 1/64; D10B 2505/04; F01N 3/2853; F01N 3/2857; F01N 2310/02
See application file for complete search history.

(56) References Cited

U.S. PATENT DOCUMENTS

| | | | |
|---|---|---|---|
| 7,998,422 B2 | 8/2011 | Ten Eyck et al. | |
| 8,071,040 B2* | 12/2011 | Beauharnois | B32B 3/12 |
| | | | 422/179 |
| 8,182,752 B2 | 5/2012 | Ten Eyck et al. | |
| 2006/0193757 A1 | 8/2006 | Li et al. | |
| 2007/0126160 A1 | 6/2007 | Takahashi | |
| 2011/0247839 A1* | 10/2011 | Lalouch | F16L 57/04 |
| | | | 169/45 |
| 2011/0268634 A1 | 11/2011 | Linsenbühler et al. | |
| 2011/0311403 A1* | 12/2011 | Kumar | F01N 3/2857 |
| | | | 422/177 |
| 2012/0074612 A1 | 3/2012 | Scrivens et al. | |
| 2013/0305697 A1* | 11/2013 | Sako | D04H 1/64 |
| | | | 60/299 |

FOREIGN PATENT DOCUMENTS

| | | | |
|---|---|---|---|
| EP | 2034154 | 3/2009 | |
| EP | 2594758 | 5/2013 | |
| EP | 2808511 | 12/2014 | |
| JP | 2002206421 | 7/2002 | |
| JP | 2005036725 | 2/2005 | |
| JP | 2011252112 A2 | 12/2011 | |
| JP | 2013079665 A2 | 5/2013 | |
| JP | 2013155750 | 8/2013 | |
| JP | 2014009637 A2 | 1/2014 | |
| WO | WO 00/17121 | 3/2000 | |
| WO | WO-0017121 A1 * | 3/2000 | .......... D04H 1/4209 |
| WO | WO 2005/021945 | 3/2005 | |
| WO | WO 2006/004974 | 1/2006 | |
| WO | WO 2007/030410 | 3/2007 | |
| WO | WO 2008/121801 | 10/2008 | |
| WO | WO 2012/106295 | 8/2012 | |
| WO | WO 2014/160665 | 10/2014 | |
| WO | WO-2014160665 A1 * | 10/2014 | ............. D04H 1/587 |

\* cited by examiner

MOUNTING MEMBER FOR WRAPPING AND MOUNTING A POLLUTION CONTROL ELEMENT

CROSS REFERENCE TO RELATED APPLICATIONS

This application is a national stage filing under 35 U.S.C. 371 of PCT/US2016/050493, filed Sep. 7, 2016, which claims priority to European Application No. 15184316.6, filed Sep. 8, 2015, the disclosures of which are incorporated by reference in their entireties herein.

FIELD OF THE INVENTION

The invention relates to a mounting member for wrapping and mounting a pollution control element in a casing of a pollution control device, with the mounting member comprising inorganic fiber material and inorganic particles. The invention also relates to a method of manufacturing a mounting member for wrapping and mounting a pollution control element in a casing of a pollution control device.

BACKGROUND

Exhaust gas cleaning systems using a ceramic catalytic converter are known as means for removing carbon monoxide (CO), hydrocarbons (HC), and nitrogen oxides (NOx) and the like that are included in exhaust gas from automobile engines. Basically, the ceramic catalytic converter generally stores a ceramic catalyst carrier with a honeycomb shape or the like in a metal casing. Other exhaust gas cleaning systems contain ceramic particulate filters for removing particulates from the exhaust gas of diesel or gasoline engines.

There are various types of ceramic catalytic converters, but a general form provides a catalyst carrier or a filter, a casing that stores the catalyst carrier or the filter, and a thermal insulation member that fills the gap between the outer surface of the catalyst carrier or the filter and the inner surface of the casing. The thermal insulation member mounts the catalyst carrier or the filter and prevents mechanical shock due to impact and vibration and the like from being inadvertently applied to the catalyst carrier or the filter. Thereby, moving and breaking of the catalyst carrier or the filter can be sufficiently suppressed, and thus the desired effect can be provided over a long period of time. This type of thermal insulation member is also commonly called a mounting member because the member has a function of mounting a pollution control element such as a catalyst carrier or a filter in a metal shell or the like.

JP 2002 206 421 A2 discloses a holding and sealing material for a catalytic converter, that can sufficiently maintain the function of retaining the pollution control element in a pollution control device at high temperatures. The holding and mounting material comprises ceramic fibers. The fibers comprise an uneven structure consisting of inorganic particles added to the fibers by sintering.

WO 2012/106295 A1 discloses a mounting member that can sufficiently suppress scattering of inorganic fiber material when a pollution control element is assembled in a casing, and that can maintain sufficiently high contact pressure between the inner surface of the casing and the pollution control element. The mounting member provides a mat made from inorganic fiber material and an aggregated substance containing an organic binder and inorganic fine particles that is impregnated throughout most of the mat.

U.S. Pat. No. 8,071,040 B2 discloses a mounting mat for an exhaust gas treatment device including high temperature resistant ceramic fibers containing alumina and/or high temperature resistant biosoluble inorganic fibers, organic binder which at least partially liquefies at elevated temperature prior to binder burnout, colloidal inorganic oxide and optionally intumescent material. The mounting mat can be easily installed and can function across a wide range of inlet gas temperatures without a significant loss in mat thickness and corresponding shear strength and holding pressure performance.

SUMMARY OF THE INVENTION

The above cited documents deal with improved behavior of mounting members during its use in a pollution control device especially with improved holding or contact pressure of the mounting member and with reducing fiber scattering. None of the documents deals with the problem of reducing the elongation of a mounting member during the assembly of a pollution control device. Elongation of a mounting member is the length difference between the mat width after assembly in a pollution control device and the width of the virgin mat.

This behavior may lead to a lower than expected mounted density of the mounting member and thus to lower contact pressure of the mounting member (mat) during the use of the pollution control device. A potential compensation of this effect by using a mounting member with a higher area weight adds cost to the system.

The width of a mounting member for a pollution control element is typically adopted to cover the length of the ceramic element of the pollution control device either completely or a significant portion of it. The elongation of a mounting member needs to be taken into account to avoid that the mounting member extends over the edge of the ceramic element after assembly. A lower elongation allows the use of wider mounting members leading to higher holding force of the ceramic element in the metallic shell.

In view of the above it is an object of the invention to provide a mounting member that on the one side can sufficiently maintain the function of retaining the pollution control element in a pollution control device during its use across wide temperature ranges and that on the other side has an improved behaviour during the assembly of the pollution control device, e.g. provides a reduced elongation during canning. The reduction of the elongation helps to reduce the amount of the relative expensive inorganic fiber material and on the other hand to ensure a high enough mount density.

It has been found that a mounting member for wrapping and mounting a pollution control element in a casing of a pollution control device, in accordance with the present invention, can provide excellent performance during the use of the pollution control device and has a reduced elongation during canning. Such a mounting member can have the following features:
  inorganic fiber material; and
  inorganic particles, wherein the inorganic particles are distributed throughout most of the mounting member and comprise an average diameter of DV 50 of 800 nm to 15000 nm measured according to DIN ISO 13320, preferably 1000 nm to 15000 nm.

The particle size is defined as DV 50, which is the median particle diameter on a volumetric basis, i.e. 50% by volume of the particles are smaller than this diameter and 50% are larger. The diameters are measured according to DIN ISO 13320.

It has been found a mounting member for wrapping and mounting a pollution control element in a casing of a pollution control device with inorganic particles being distributed throughout most of the mounting member, wherein the size of the particles is in the claimed range provides an improved elongation during mounting the pollution control device while still showing sufficient retaining forces of the pollution control element in a pollution control device during its use across wide temperature ranges. The positive effect in elongation may also reduce the waste during production and may therefore provide a cost benefit.

According to one embodiment, the inorganic fiber material of the mounting member may comprise fibers selected from the group of glass fibers, ceramic fibers, carbon fibers, silicon carbide fibers or boron fibers or a combination thereof. Other fibers are possible as well as long as they withstand the high temperatures occurring in a pollution control device and the required holding forces during use of the pollution control device.

According to another embodiment of the invention, the inorganic fiber material may be needle punched. Other ways of compressing the inorganic fiber material may be used as well such as for example stitch-bonding, resin bonding, applying pressure and/or combinations thereof.

According to another embodiment of the invention, the inorganic particles are selected from the group consisting of metal oxides, metal hydroxides, metal oxide hydroxides, silicates, clays, nitrides, carbides, sulphides, carbonates and combinations thereof. They may for example be selected from Dispal™ particles from Sasol Corporation, USA. With Dispal™ 23N4-80 and Dispal™ 18N4-80 particles from Sasol Corporation, USA very good results have been achieved as will be explained in the example section of this patent application.

According to one embodiment the mount member may contain organic binder up to 3 wt. %. It is also possible to achieve good results without any binder, as shown in the examples. But the use of binder may under certain conditions lead to better results of the elongation. The amount of binder used needs to be optimized regarding the ability to sufficiently hold the pollution control element within the pollution control device during use.

According to another embodiment, the inorganic particles may get impregnated through the mat by using a water base slurry containing the inorganic particles. An easy way of distributing the particles throughout the mat is to prepare a slurry, for example a water based slurry and apply the slurry onto the mat. The slurry needs to be of a concentration that allows the particles to migrate throughout most of the mat. If the slurry is too concentrated, which means if the concentration of particles within the slurry is too high, the risk exists, that the particles stay on the surface of the mounting member and do not migrate into the mounting member. It is also possible to distribute the particles within the mounting member during the fiber laying process by mixing the particles with the fibers before laying them to a mat.

The slurry may contain at least 80 wt. %, preferably 90 wt. % and more preferably 95 wt. % of water. The slurry may also contain an organic binder.

The organic binder may comprise at least one of polymers or copolymers of acrylate, methacrylate, styrene, butadiene, vinyl pyridine, acrylonitrile, vinyl chloride, vinyl acetate, vinyl alcohol or ethylene, polyurethane, polyamides, silicones, polyesters, epoxy resins, or combinations thereof.

Furthermore the concentration of the inorganic particles within the mounting member may be between 0.5 and 5 wt. %, preferred between 1.0 and 2.5 wt. %.

According to yet another embodiment, the maximum reduction of mount density of a mounting member according to the invention may be 3% caused by an elongation of the mounting member during stuffing at a calculated mount density of 0.4 g/cm³. The calculated mount density of the mounting member in the pollution control device (assuming no mat elongation) is calculated by dividing the weight per area 2 times by the difference between metal shell inner diameter minus the pollution control element outer diameter. The following formula illustrates the calculation:

$MD_c$—calculated mount density
$W/A_m$—weight per area or area weight of mounting member (mat)
$ID_{ms}$—metal shell inner diameter
$OD_{pce}$—pollution control element outer diameter
$Wt_m$—weight of (mat)
$L_m$—length of mat
$W_m$—width of mat (=length of pollution control element)

$$MD_c = \frac{W/A \times 2}{ID_{ms} - OD_{pce}}$$

whereby W/A is calculated as follows:

$$W/A = \frac{Wt_m}{L_m \times W_m}$$

Calculation of the mount density reduction: After canning the mounting member may extend over the pollution control element due to its elongation during the canning process. This portion of the mat is cut off and weighed. This cut off weight is subtracted from the original mat weight and the reduced weight per area of the mat after canning is calculated based on its original dimension. The mount density after canning is calculated using the weight per area after canning. The mount density difference is calculated in percent of the calculated mount density. The following formula illustrates the calculation:

$MD_{red}$—mount density reduction
$MD_{ac}$—mount density after canning
$Wt_{em}$—weight of mat extended over the edge of the pollution control element after canning $$W/A_{ac} = \frac{Wt_m - Wt_{em}}{L_m \times W_m}$$

$$MD_{ac} = \frac{W/A_{ac} \times 2}{ID_{ms} - OD_{pce}}$$

$$MD_{red} = \frac{MD_c - MD_{ac}}{MD_c} \times 100\%$$

The mounting member may comprise intumescent material disposed in the mat member. As used herein, "intumescent material" means a material that expands, foams, or swells when exposed to a sufficient amount of thermal energy. Useful intumescent materials for use in making an intumescent mounting member may include, but are not limited to, unexpanded vermiculite ore, treated unexpanded vermiculite ore, partially dehydrated vermiculite ore, expandable graphite, mixtures of expandable graphite with treated or untreated unexpanded vermiculite ore, processed expandable sodium silicate, for example EXPANTROL™ insoluble sodium silicate, commercially available from 3M Company, St. Paul, Minn., and mixtures thereof. Another example of a desirable commercially available expandable graphite material is GRAFOIL™ Grade 338-50 expandable graphite flake, from UCAR Carbon Co., Inc., Cleveland, Ohio.

The invention also relates to a method of manufacturing a mounting member for wrapping and mounting a pollution control element in a casing of a pollution control device comprising the following steps:

preparing a water based slurry containing fine inorganic particles with an average diameter DV 50 of 800 nm to 15000 nm measured according to DIN ISO 13320, preferably DV 50 of 1000 nm to 15000 nm measured according to DIN ISO 13320; and impregnating a mat containing inorganic fiber material with the slurry.

The method according to the invention may also comprise a drying step after the impregnating step. The drying may be done by room temperature or by elevated temperatures, such as for example temperatures between 100° C. and 180° C. The drying may also be done by using an air stream.

The slurry used for the method according to the invention may contain an organic binder.

And finally the invention relates to the use of inorganic particles for producing a mounting member for wrapping and mounting a pollution control element in a casing of a pollution control device, wherein the average diameter of the fine particles ranges from DV 50 of 800 nm to 15000 nm measured according to DIN ISO 13320, preferably from DV 50 of 1000 nm to 15000 nm according to DIN ISO 13320.

BRIEF DESCRIPTION OF THE DRAWINGS

The invention will now be described in more detail with reference to the following Figures exemplifying particular embodiments of the invention.

DETAILED DESCRIPTION OF EMBODIMENTS OF THE INVENTION

Figure 1:
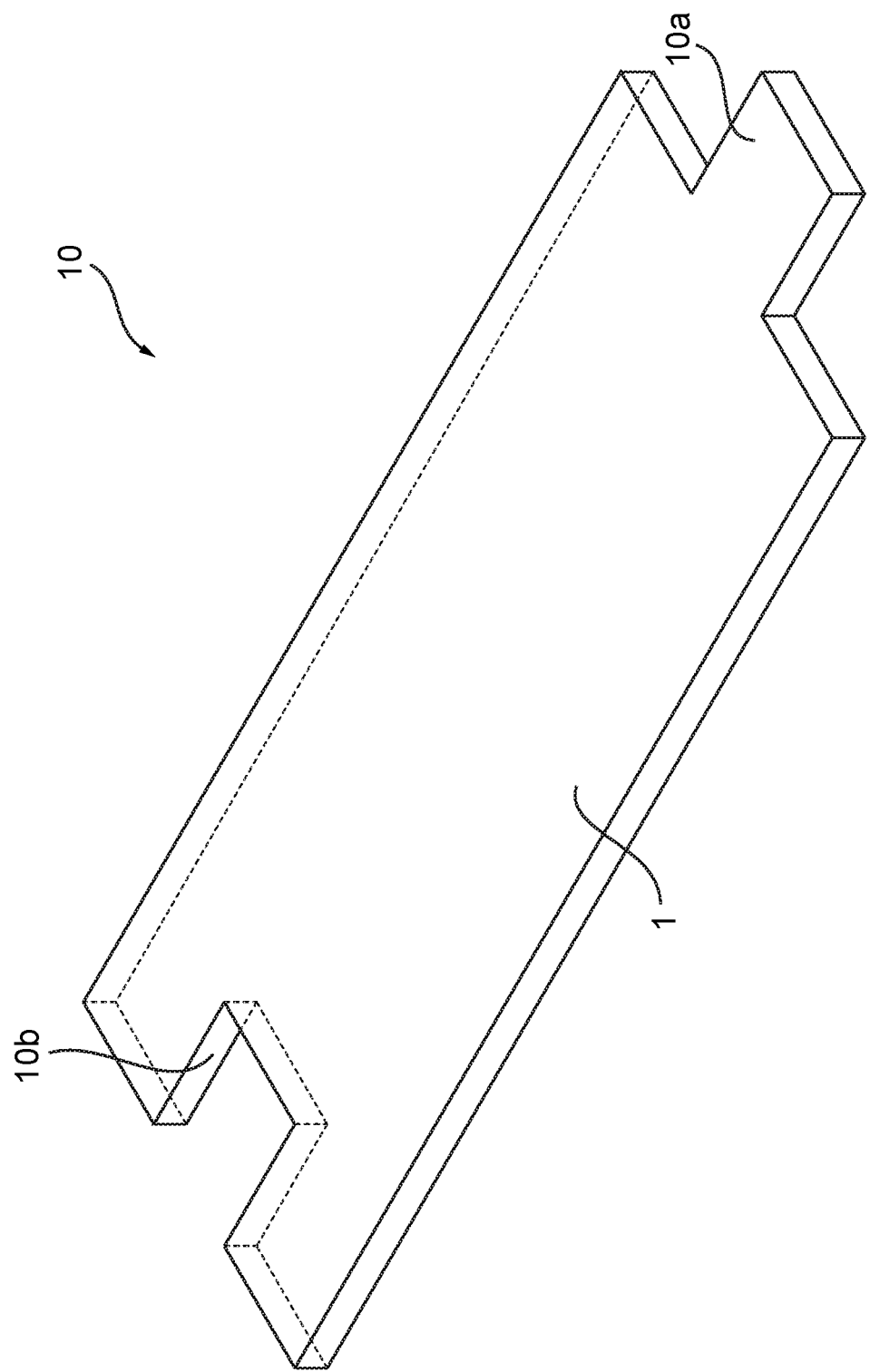
FIG. 1 is a perspective view illustrating the retaining material according to an embodiment of the present invention.

Herein below various embodiments of the present invention are described and shown in the drawings wherein like elements are provided with the same reference numbers.

FIG. 1 is a perspective view illustrating an example of the mounting member of the present invention. The mounting member 10 illustrated in this figure has a major surface 1 on either side and may be wrapped around a pollution control element 30 having for example a round cylindrical or elliptical cylindrical outer shape, in order to retain the element in a casing 20 (refer to FIG. 2). All other shapes of the pollution control element 30 are possible as well. The mounting member 10 has a length that is in accordance with the length of the outer circumference of the pollution control element 30. The mounting member 10 has a convex part 10a and a concave part 10b on another end, for example, and has a shape such that the convex part 10a and the concave part 10b mutually engage when the mounting member 10 is wrapped around the pollution control element 30, but the shape for the mating is not restricted in particular, and any shape that can effectively prevent leaking of the exhaust gas in the mating region is acceptable, and other shapes such as an L shape are also possible. The mounting member 10 has also a width that is in accordance with the length of the pollution control element 30. As already pointed out above the width of the mounting member 10 needs to take into account an elongation of the mounting member 10 that might occur, when the mounting member 10 being wrapped around the pollution control element 30 gets stuffed into the casing 20, to avoid that the mounting member 10 after stuffing extends over the edge of the pollution control element 30.

Figure 2:
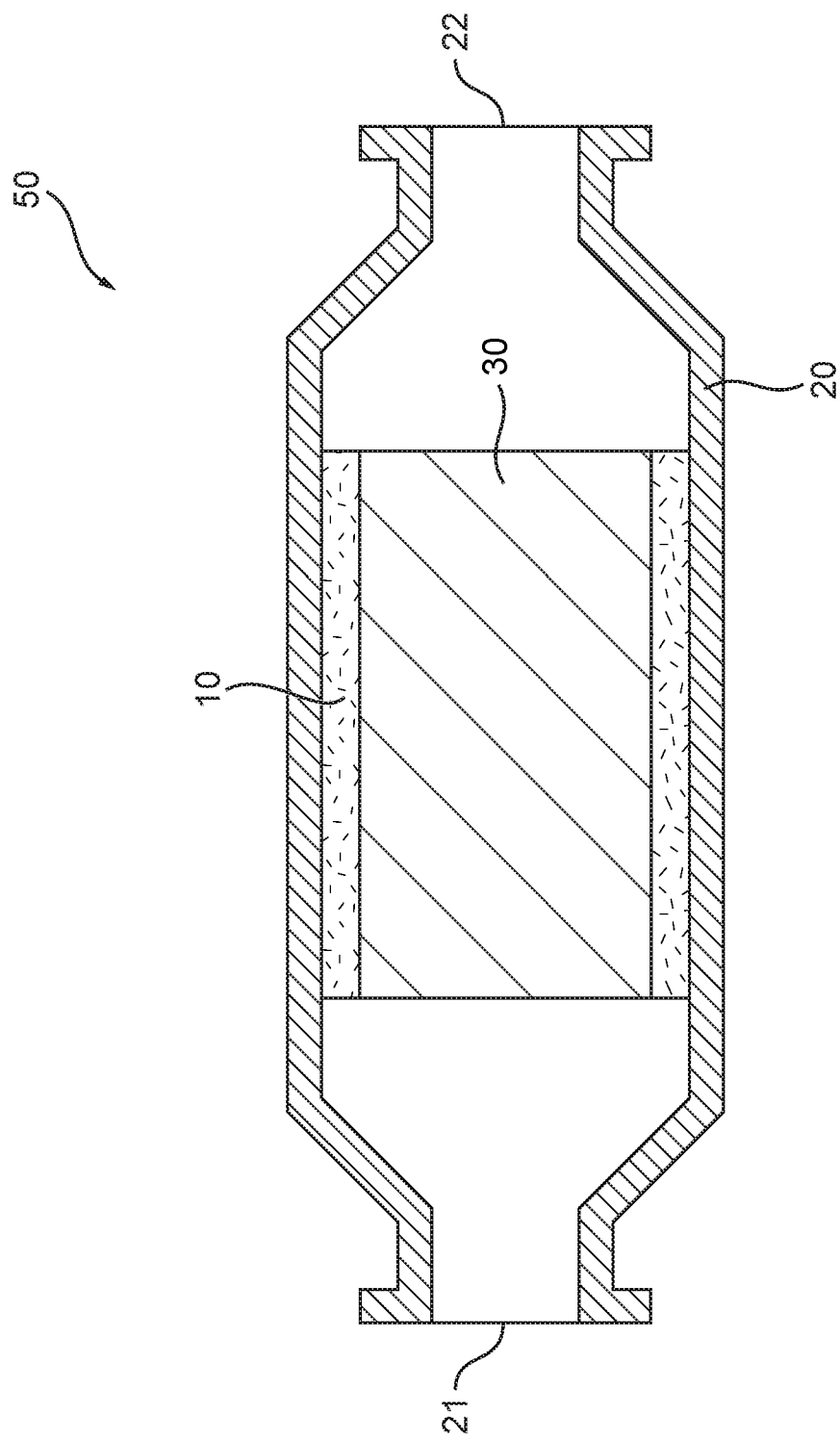
FIG. 2 is a cross-sectional view schematically illustrating the pollution control device according to an embodiment of the present invention.

FIG. 2 shows the mounting member 10 that is used to retain the pollution control element 30 in a pollution control device 50. A specific example of the pollution control element 30 is a catalyst carrier or a filter element or the like that is used for cleaning the exhaust gas from an engine. Specific examples of the pollution control device 50 include catalytic converters and exhaust cleaning devices (for example, a particulate filter device).

The pollution control device 50 illustrated in FIG. 2 has a casing 20, a pollution control element 30 provided in the casing 20, and a mounting member 10 provided between the inner surface of the casing 20 and the outer surface of the pollution control element 30. The pollution control device 50 also has a gas intake port 21 where the exhaust gases are introduced to the pollution control element 30, and a gas discharge port 22 where the exhaust gas that has passed through the pollution control element 30 is discharged.

The width of the gap between the inner surface of the casing 20 and the outer surface of the pollution control element 30 may be between 1.5 to 15 mm, preferably 3 to 10 mm. The mounting member 10 is preferably in an appropriately compressed condition to achieve a suitable bulk density between the casing 20 and the pollution control element 30. By using the mounting member 10 according to the invention to retain the pollution control element 30, a sufficiently high surface pressure can be maintained between the inner surface of the casing 20 and the pollution control element 30. Furthermore, the elongation during the mounting of the pollution control element into the pollution control device can be reduced as compared to conventional mounting members, and therefore the usage amount of the relative expensive inorganic fiber material can be reduced.

EXAMPLES

The present invention is described while referencing examples. Note that the present invention is in no way restricted by these examples.

All examples are based on alumina-silica fiber blankets from Mitsubishi Plastics Inc. (Maftec MLS 2). The mats are spray impregnated with a slurry of inorganic particles. In some examples an additional an organic latex binder was added to the slurry in addition to the inorganic particles. The impregnated mats were dried and then tested. The tests include multi-cycle compression testing at elevated temperatures and hard stuffing tests to determine the mat elongation.

Components Examples

Inorganic particles: Dispal™ 23N4-80, Dispal™ 18N4-80 both from Sasol Corporation, 12120 Wickchester Lane, Houston TX 77079, USA Organic binder: Acronal™ A273 S from BASF SE, Ludwigshafen, Germany.

Components Comparative Examples

Inorganic particles: Snowtex™ OS; Nissan Chemical Industries, Japan; Colloidal Alumina; Nissan Chemical Industries, Japan Organic binder: Nipol™ LX 874; Nippon Zeon Co., Japan Slurry Preparation:

The slurries for impregnation were prepared by adding the inorganic particles to water in an amount according to the below table and stirring with a laboratory mixer for 5 minutes. In some samples (see also below table) additional organic binder was added afterwards and was stirred for 1 additional minute.

| Example No. | Inorganic Particle or Slurry | Organic Binder Emulsion | Inorganic Particle or slurry wt. % | Organic Binder Emulsion wt. % | Water wt. % |
|---|---|---|---|---|---|
| 1 | Dispal 23N4-80 | None | 0.74 | — | 99.3 |
| 2 | Dispal 23N4-80 | Acronal A273S | 0.74 | 0.18 | 99.1 |
| 3 | Dispal 18N4-80 | None | 0.74 | — | 99.3 |
| 4 | Dispal 18N4-80 | Acronal A273S | 0.74 | 0.18 | 99.1 |
| Comp. Ex. 1 | no particles | no binder | — | — | |
| Comp. Ex. 2 | Snowtex OS | Nipol LX874 | 4.6 | 0.13 | 95.3 |
| Comp. Ex. 3 | Colloidal Alumina | Nipol LX874 | 6.7 | 0.13 | 93.2 |
| Comp. Ex. 4 | Snowtex OS | Nipol LX874 | 4.6 | 0.13 | 95.3 |
| Surface Coating Comp. Ex. 2 and 3 | Snowtex OS | Nipol LX874 | 48.5 | 1.5 | 50.0 |

Example 1

A sheet of the MLS 2 blanket was cut into pieces and impregnated by spraying the above described slurry containing the Dispal™ 23N4-80 particles, particle size 1.87 nm (DV 50) measured according to DIN ISO 13320, onto the blanket. After the liquid was impregnated into the blanket in this manner, drying was performed in a forced air dryer for 15 minutes at 150° C. air temperature. The impregnated and dried mounting member contained about 1.5% by weight of the particles.

Example 2

A sheet of the MLS 2 blanket was cut into pieces and impregnated by spraying the above described slurry containing the Dispal™ 23N4-80 particles, particle size 1.87 nm (DV 50) measured according to DIN ISO 13320, and the organic binder Acronal™ A273S, onto the blanket. After the liquid was impregnated into the blanket in this manner, drying was performed in a forced air dryer for 15 minutes at 150° C. air temperature. The impregnated and dried mounting member contained about 1.5% by weight of the inorganic particles and 0.8% by weight organic binder.

Example 3

A sheet of the MLS 2 blanket was cut into pieces and impregnated by spraying the above described slurry containing the Dispal™ 18N4-80 particles, particle size 3.51 nm (DV 50) measured according to DIN ISO 13320, onto the blanket. After the liquid was impregnated into the blanket in this manner, drying was performed in a forced air dryer for 15 minutes at 150° C. air temperature. The impregnated and dried mounting member contained about 1.5% by weight of the particles.

Example 4

A sheet of the MLS 2 blanket was cut into pieces and impregnated by spraying the above described slurry containing the Dispal™ 18N4-80 particles, particle size 3.51 nm (DV 50) measured according to DIN ISO 13320, and the organic binder Acronal™ A273 S, onto the blanket. After the liquid was impregnated into the blanket in this manner, drying was performed in a forced air dryer for 15 minutes at 150° C. air temperature. The impregnated and dried mounting member contained about 1.5% by weight of the particles and 0.8% by weight of the organic binder.

Comparative Example 1a

MLS 2 blanket without any treatment was cut into pieces and used as comparative example 1a. For the stuffing and multi-cycle tests, the mounting density was adapted to the mounting density of examples 1 and 2.

Comparative Example 1b

MLS 2 blanket without any treatment was cut into pieces and used as comparative example 1b. For the stuffing and multi-cycle tests, the mounting density was adapted to the mounting density of examples 3 and 4.

Comparative Example 2

A comparative sample was prepared by adding inorganic colloid particles (Snowtex™ OS, produced by Nissan Chemical Industries, Ltd.) 68.55 g and 2.0 g organic binder (Nipol™ LX874, produced by Nippon Zeon Co., Ltd.) to 1429.50 g Water and stirring for 5 minutes. The inorganic colloidal particles had a particle size of 16.9 nm (DV 50) measured according to DIN ISO 13320. A needle punched alumina fiber blanket (produced by Mitsubishi Plastics, Inc.) was impregnated by spraying the above described slurry onto the blanket. After the liquid was impregnated into the blanket in this manner, drying was performed for 15 minutes using a forced air dryer with the temperature set to 150° C.

A second liquid containing inorganic colloid particles and organic binder was prepared by adding 63 g of colloidal silica (Snowtex™ OS) and 10 g Nipol™ LX874 to 65 g of water and stirring for 1 minute. The second liquid was coated to both an upper and lower surface of the blanket that had been impregnated before with the first liquid. In total the amount of 7 g/m² of colloid silica was sprayed onto both surfaces and the total amount of organic binder was 0.8%. The impregnated material was dried for 5 minutes in a forced air dryer with temperature set to 150° C.

Comparative Example 3

A first liquid containing colloidal particles and organic binder was prepared by adding 201 g of colloidal alumina (alumina sol, produced by Nissan Chemical Industries, Ltd.) and 3.99 g organic binder (Nipol™ LX874, produced by Nippon Zeon Co., Ltd.) to 2790 g Water and stirring for 5 minutes. The inorganic colloidal particles had a particle size of 0.76 nm (DV 50) measured according to DIN ISO 13320. A needle punched alumina fiber blanket (produced by Mitsubishi Plastics, Inc.) was impregnated by spraying the above described slurry onto the blanket. After the liquid was impregnated into the blanket in this manner, drying was performed for 15 minutes using a forced air dryer with the temperature set to 150° C.

A second liquid containing inorganic colloid particles and organic binder was prepared by adding 63 g of colloidal silica (Snowtex™ OS) and 10 g Nipol™ LX874 to 65 g of water and stirring for 1 minute. The second liquid was coated to both an upper and lower surface of the blanket that had been impregnated before with the first liquid. In total the amount of 7 g/m² of colloid silica was sprayed onto both surfaces and the total amount of organic binder was 0.8%. The impregnated material was dried for 5 minutes in a forced air dryer with temperature set to 150° C.

Comparative Example 4

A further comparative sample was prepared by adding inorganic colloid particles (Snowtex™ OS, produced by Nissan Chemical Industries, Ltd.) 68.55 g and 2.0 g organic binder (Nipol™ LX874, produced by Nippon Zeon Co., Ltd.) to 1429.50 g Water and stirring for 5 minutes. The inorganic colloidal particles had a particle size of 16.9 nm (DV 50) measured according to DIN ISO 13320. A needle punched alumina fiber blanket (produced by Mitsubishi Plastics, Inc.) was impregnated by spraying the above described slurry onto the blanket. After the liquid was impregnated into the blanket in this manner, drying was performed for 15 minutes using a forced air dryer with the temperature set to 150° C.

Evaluation Tests
Measurement of Particle Size

The particle size is determined with laser diffraction according to DIN ISO 13320: 2009(E). The particle size is defined as DV50, which is the median particle diameter on a volumetric basis, i.e. 50% by volume of the particles are smaller than this diameter and 50% are larger.

Measurement of Multi Cycle Compression

The multi-cycle compression test is frequently used to design applications. The Examples were tested at a temperature of 650° C., the gap was cycled 1000 times between a closed gap and an open gap density. The open gap pressure after cycling is recorded.

For the tests in these examples a material test machine from Zwick/Roell Model Z010 from Zwick Gmbh & Co KG, Ulm, Germany was utilized. The test machine was equipped with a lower fixed heatable stainless steel block and a load cell capable of measuring forces up to 10 kN and an upper heatable stainless steel block mounted to the movable crosshead of the test machine. For the tests a sample of each example and comparative example with 50.8 mm diameter was cut out of the mounting member and placed on the lower heatable stainless steel block. The crosshead was moved downwards to compress the mounting member to a defined closed gap, which corresponds to a density of the mounting member of 0.366 g/cm³. The temperature of the heatable stainless steel blocks was raised to 650° C. while keeping the gap constant. After reaching the temperature of 650° C., the gap was cycled between the closed gap position corresponding to a density of the mounting member of 0.366 g/cm³ and an open gap position corresponding to a density of the mounting member of 0.329 g/cm³. After 1000 cycles the test was stopped and the open gap pressure after 1000 cycles was recorded.

Measurement of Elongation

Hard stuffing experiments were conducted to determine the elongation of the mounting members. The area weight of the mounting members, the metal shell inner diameter, and the pollution control element outer diameter were chosen to achieve a desired calculated mount density. The metal shell was calibrated using a shrinking machine from the company Wecotech, Gahwil, Switzerland. The transition angle between the inner shell diameter at the entrance side and the calibrated inner diameter was kept between 14° and 16°, in order to ensure consistent conditions for each example.

The mounting members were cut so that they covered the complete length of the pollution control element. The mounting members were wrapped around the corresponding pollution control element and the stuffing was performed using a stuffing funnel with a contraction of 1.6°. A compression test machine MTS Alliance RT/30 from MTS, Eden Prairie, MN, USA was utilized to push the pollution control element together with the mounting member into the metal shell at a defined speed of 500 mm/min.

After stuffing the mat extended over the pollution control element due to the elongation during the stuffing process. This portion of the mat was cut and weighed to determine the effective mount density of the mat in the pollution control device.

In the following table the particle diameters of all examples and comparative examples are shown as well as the measured elongation and the results of the multi-cycle compression test:

| | Particle dia. (DV 50) nm | Mat weight (g) | Calcul. mount density* (g/cm³) | Elongation | | | Multi-Cycle-Compression | | |
|---|---|---|---|---|---|---|---|---|---|
| | | | | Weight of material extend. over the edge (g) | Eff. mount density (g/cm³) | Mount density reduction** % | Closed cap density (g/cm³) | Open gap density (g/cm³) | Open gap press. after 1000 cycles (kPA) |
| Example 1 | 1.87 | 124.9 | 0.391 | 2.02 | 0.385 | 1.5 | 0.366 | 0.329 | 84 |
| Example 2 | 1.87 | 125.1 | 0.392 | 2.843 | 0.383 | 2.3 | 0.366 | 0.329 | 75 |
| Comp. Ex. 1a | — | 123.5 | 0.391 | 4.25 | 0.378 | 3.3 | 0.366 | 0.329 | 70 |
| Example 3 | 3.51 | 126.3 | 0.401 | 2.965 | 0.392 | 2.2 | 0.366 | 0.329 | 68 |
| Example 4 | 3.51 | 128.8 | 0.402 | 3.696 | 0.390 | 3.0 | 0.366 | 0.329 | 55 |
| Comp. Ex. 1b | — | 127.6 | 0.398 | 4.815 | 0.393 | 3.8 | See Comp. Ex. 1a | | |
| Comp. Ex. 2 | 16.9 | Does not work in canning process—the mat does not slide into the can and is destroyed during the stuffing process | | | | | | | |
| Comparative Example 3 | 0.76 | Does not work in canning process—the mat does not slide into the can and is destroyed during the stuffing process | | | | | | | |
| Comparative Example 4 | 16.9 | Does not work in canning process—the mat does not slide into the can and is destroyed during the stuffing process | | | | | | | |

*Calculated mount density: is the calculated mount density of the mounting member in the pollution control device (assuming no mat elongation). It is calculated by dividing the weight per area 2 times by the difference between metal shell inner diameter minus pollution control element outer diameter.

$MD_c$—calculated mount density
$W/A_m$—weight per area or area weight of mounting member (mat)
$ID_{ms}$—metal shell inner diameter
$OD_{pce}$—pollution control element outer diameter
$Wt_m$—weight of (mat)
$L_m$—length of mat
$W_m$—width of mat (= length of pollution control element)

$$MD_c = \frac{W/A \times 2}{ID_{ms} - OD_{pce}}$$

$$W/A = \frac{Wt_m}{L_m \times W_m}$$

**Mount density reduction: (Uli kannst Du bitte noch angeben, wie die berechnet wird?) After canning the mat extends over the pollution control element due to its elongation during the canning process. This portion of the mat is cut off and weighed. This cut off weight is subtracted from the original mat weight and the reduced weight per area of the mat after canning is calculated based on its original dimension. The mount density after canning is calculated using the weight per area after canning. The mount density difference is calculated in percent of the calculated mount density.

$MD_{red}$—mount density reduction
$MD_{ac}$—mount density after canning
$Wt_{em}$—weight of mat extended over the edge of the pollution control element after canning $$W/A_{ac} = \frac{Wt_m - Wt_{em}}{L_m \times W_m}$$

$$MD_{ac} = \frac{W/A_{ac} \times 2}{ID_{ms} - OD - pce}$$

$$MD_{red} = \frac{MD_c - MD_{ac}}{MD_c} \times 100\%$$

The results show:

It can be seen from the table above, that the examples 1 to 4 with the inorganic particles distributed through the mat show less elongation than the comparative example 1a and 1b. Comparative examples 2, 3 and 4 failed completely during the canning, the mats did not slide into the can and were destroyed. For these mounting members no elongation could be measured.

The results show also that the examples 1 and 2, with 1.5% Dispal™ 23N4-80 show the higher results in the multi-cycle compression test. The open gap pressure after 1000 cycles for Examples 3 and 4 is lower than the one for comparative example 1a or 1b but they are still acceptable.

The invention claimed is:

1. A pollution control device comprising:
    a casing;
    a pollution control element disposed in the casing; and
    a mounting member wrapped around the pollution control element and disposed between the pollution control element and the casing, the mounting member comprising:
        inorganic fiber material; and
        inorganic particles,
    wherein the inorganic particles are distributed throughout most of the mounting member and have an average diameter of 1000 nm to 15000 nm (DV 50) measured according to DIN ISO 13320,
    wherein the inorganic particles are not colloidal particles, and
    wherein the inorganic particles are selected from the group consisting of metal oxide hydroxides.

2. The pollution control device according to claim 1 wherein the inorganic fiber material comprises fibers selected from the group of glass fibers, ceramic fibers, carbon fibers, silicon carbide fibers or boron fibers or a combination thereof.

3. The pollution control device according to claim 1, wherein the inorganic fiber material of the mounting member is needle-punched.

4. The pollution control device according to claim 1, wherein the mounting member contains organic binder up to 3 wt. %.

5. The pollution control device according to claim 1, wherein the inorganic particles get impregnated through the mat by using a water based slurry containing the inorganic particles.

6. The pollution control device according to claim 5, wherein the slurry contains at least 80 wt. % water.

7. The pollution control device according to claim 5, wherein the slurry contains an organic binder.

8. The pollution control device according to claim 7, wherein the organic binder comprises at least one of polymers or copolymers of acrylate, methacrylate, styrene, butadiene, vinyl pyridine, acrylonitrile, vinyl chloride, vinyl acetate, vinyl alcohol or ethylene, polyurethane, polyamides, silicones, polyesters, epoxy resins, or combinations thereof.

9. The pollution control device according to claim 1, wherein the concentration of the inorganic particles within the mounting member is between 0.5 and 5 wt. %.

10. The pollution control device according to claim 1, having a maximum reduction of the mount density of 3% caused by elongation of the mounting member during stuffing at a calculated mount density of 0.4 g/cm$^3$.

11. The pollution control device according to claim 1, wherein the mounting member comprises intumescent material disposed in the mounting member.

12. Method of manufacturing the pollution control device according to claim 1, said method comprising:
preparing a water based slurry containing the inorganic particles with an average diameter of 1000 nm to 15000 nm (DV 50) measured according to DIN ISO 13320;
impregnating a mat containing the inorganic fiber material with the slurry such that the inorganic particles are distributed throughout most of the mounting member.

13. The method according to claim 12, wherein the method comprises a drying step after the impregnating step.

14. The pollution control device according to claim 1, wherein the concentration of the inorganic particles within the mounting member is between 1.0 and 2.5 wt. %.

15. The pollution control device according to claim 9, having a maximum reduction of the mount density of 3% caused by elongation of the mounting member during stuffing at a calculated mount density of 0.4 g/cm$^3$.

16. The pollution control device according to claim 14, having a maximum reduction of the mount density of 3% caused by elongation of the mounting member during stuffing at a calculated mount density of 0.4 g/cm$^3$.

17. The pollution control device according to claim 15, wherein the inorganic fiber material of the mounting member is needle-punched, and the mounting member contains organic binder up to 3 wt. %.

18. The pollution control device according to claim 16, wherein the inorganic fiber material of the mounting member is needle-punched, and the mounting member contains organic binder up to 3 wt. %.

\* \* \* \* \*